Patented Nov. 12, 1940

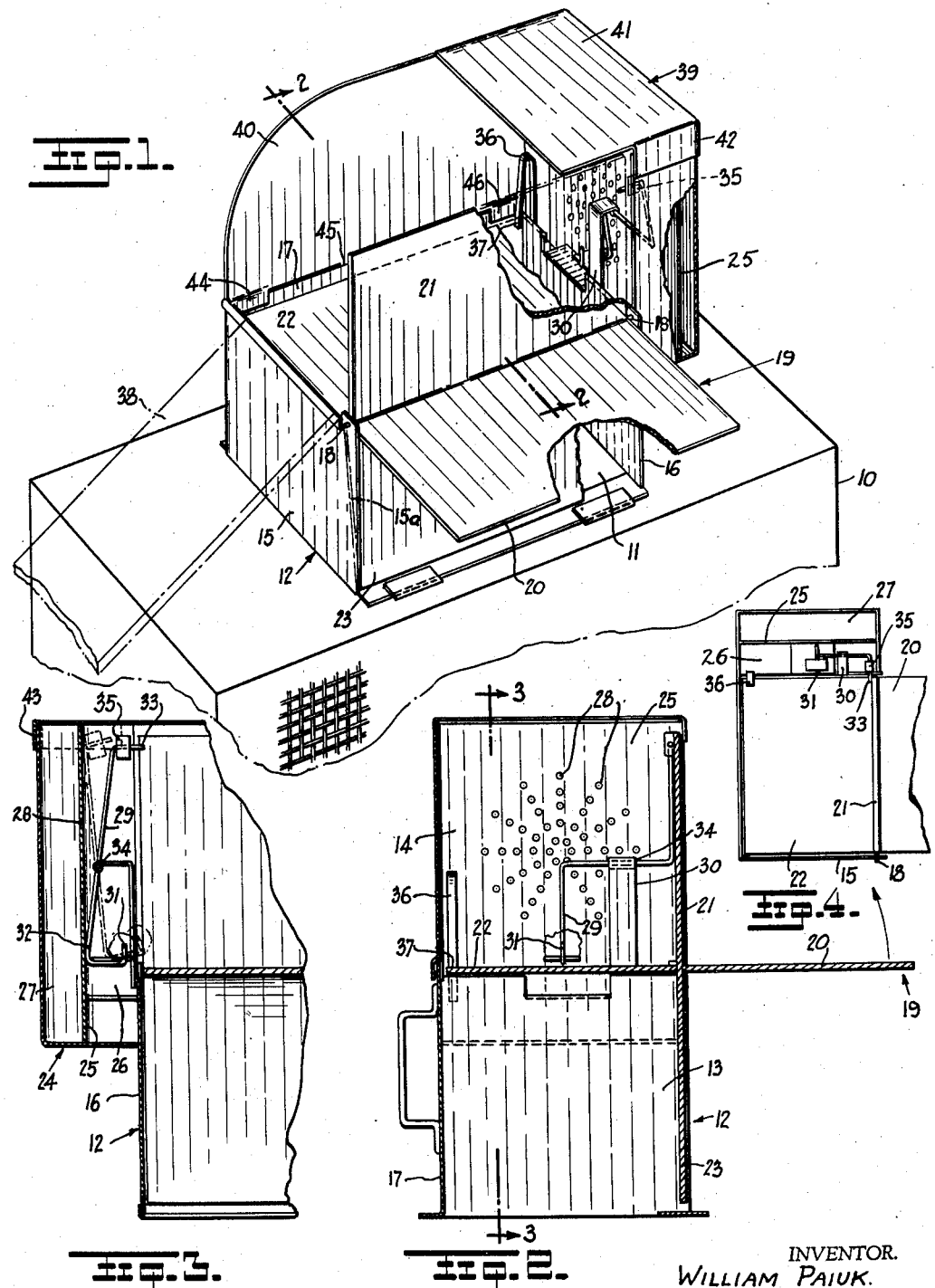

2,221,406

UNITED STATES PATENT OFFICE 2,221,406

ANIMAL TRAP

William Paiuk, New York, N. Y.

Application June 3, 1940, Serial No. 338,457

5 Claims. (Cl. 43—72)

This invention relates to animal traps and particularly to an improved form of mouse or rat trap.

It is primarily within the contemplation of my invention to provide an improved form of rotatable platform mouse and rat trap so constructed that when the animal steps on the platform and attempts to take the bait, it will be precipitated into an underlying receptacle or cage. And in this aspect of my invention, it is an object to enable the platform to be released from its stationary supporting position without the use of any spring means.

It is another object of my invention to provide a compartment for accommodating a food or other substance, independent of the bait, giving off an odor attractive to and readily detectable by the animal. And in this aspect of my invention it is a further object to provide a perforated wall serving the double purpose of acting as a stop for the bait holder and permitting the passage therethrough and into the region of the bait of the odorous vapors from the said compartment.

It is another object of my invention to provide a simple readily assembled and disassembled structure for accomplishing the aforesaid objectives.

Other objects, features and advantages will appear from the drawing and the description hereinafter given.

Referring to the drawing,

Figure 1 is a perspective view of my invention shown in combination with a suitable underlying cage, an inclined plane being indicated in dot-dash lines to show one means of access to the revolving platform.

Figure 2 is a vertical section of Figure 1 taken substantially along line 2—2.

Figure 3 is a fragmentary vertical section taken substantially along line 3—3 of Figure 2, and Figure 4 is a fragmentary plan view, in reduced scale, of the trap with the upper portion removed.

In the drawing, the bottom receptacle or cage 10 contains an opening 11 at the top thereof, and has surmounted thereupon the upper unit 12 containing an intermediate chamber 13 and an upper or entrance chamber 14, and including a forward wall 15, a rear wall 16 and a side wall 17. The said front and rear walls 15 and 16 contain, at the upper portions thereof and at the side opposite said lateral wall 17, suitable bearing apertures for readily accommodating the axial shafts or pins 18 of the rotatable wheel 19.

Said wheel contains four platforms 20, 21, 22 and 23 extending radially at right angles to each other from the axis of said pins 18—18.

Suitably attached to unit 12, and preferably to the rear wall 16 thereof, is the housing 24 containing therein a partition wall 25 forming a forwardly disposed compartment 26 for bait and a rearwardly disposed compartment 27 for accommodating a suitable food or other substance adapted to give off an odor readily detectable by and attractive to the intended animal victim. In the preferred form of my invention, the said partition wall 25 contains perforations 28 therein so as to permit the odoriferous vapor from compartment 27 to enter into the bait compartment 26.

A bait holder 29 is pivotally mounted on support 30 which, in the form of my invention illustrated, is supported by the rear wall 16. The said holder has at the lower extremity thereof the bait hook 31 positioned within compartment 26, the lower portion 32 of the bait holder 29 being normally in abutment with the partition 25. The upper portion of bait holder 29 contains an arm 33 extending forwardly of the pivotal mounting 34 of support 30; and suitably secured to said arm 33 is the weight 35 which is also forwardly disposed with respect to pivotal mounting 34. It is thus evident that the weight 35 will normally tend to cause the bait hook 31 to be in its rearmost retracted position with portion 32 of the bait holder in abutment with wall 25.

The aforesaid forwardly extending arm 33 of the bait hook 29 is normally disposed within entrance chamber 14 and directly against the vertical platform 21 (see Figure 3). It is thus evident that arm 33 serves as a stop to prevent a counter-clockwise rotation of the wheel 19 when the hook 31 is in its said retracted position. When the wheel is positioned with its platforms 20 and 22 in their normal horizontal positions, the inverted U-shaped spring stop 36 has its forward terminal 37 in engagement with the upper surface of platform 22, near the region of lateral wall 17. In the preferred form of my invention, said spring stop 36 is mounted on the rear wall 16. It is thus apparent that when the wheel is in this position, it is unable to rotate in any direction. However, upon a retraction of arm 33 and a consequent operative movement of the wheel in a counter-clockwise direction, the platform 21 will slidably engage the forward prong of the spring member 36 and yieldably urge it rearwardly until said platform 21 is in underlying engagement with the said lowermost portion 37 of the stop 36.

In the operation of this device, the animal is lured towards entrance chamber 14, and can readily gain access thereto by any approach means, such as the platform 38. The intended victim is attracted towards bait chamber 26, which not only contains the bait on hook 31, but is also permeated with the odoriferous vapors from compartment 27. When the hook 31 is pulled forwardly upon the attempt of the animal to take the bait, the arm or stop 33 of the bait holder is retracted, thereby releasing platform 21. Due to the weight of the animal, the wheel will rotate in a counter-clockwise direction, and the animal will be precipitated through intermediate chamber 13 into the cage 10,—carrying the wheel around until platform 21 is in a horizontal position. The animal will be then imprisoned in the cage due to the fact that the wheel 19 is held against rotation by the stops 33 and 36, as aforesaid. Without any further setting except possibly a replenishment of the bait, it is apparent that the trap is in position for the next victim.

It will be observed that no springs are required to re-position the bait holder 29 in its normal position, inasmuch as the weight 35 normally returns the bait hook into its proper position. And it will be further noted that the wall 25 serves not only as a means of providing a passageway for the vapors from compartment 27 to compartment 26, but also as a stop to hold the hook member 29 in both its retracted and projected positions.

The entrance chamber 14 is formed by the vertical platform 21, the partition wall 25 and the cover unit 39 consisting of a lateral wall 40 and a top 41 provided with flanges 42 and 43. The lower portion of lateral wall 40 contains the downwardly extending holding strips 44, 45 and 46, two of such strips 44 and 46 being offset in one direction, and strip 45 in the other direction so as to enable such strips to engage opposite sides of the said lateral wall 17. In this manner the upper unit 39 is frictionally held in place, and is easily demountable.

It is preferred that the forward wall 15 be of resilient material or yieldably mounted, so that it could be moved forwardly to the dot-dash position 15a when it is desired to remove the wheel 19. This arrangement materially helps in assembling and disassembling the unit.

It is of course understood that the embodiment above-described and shown in the drawing is illustrative of my invention and not employed by way of limitation, inasmuch as numerous changes and modifications may be made therein within the scope of the appended claims without departing from the spirit of this invention.

What I claim is:

1. In an animal trap, a rotatably mounted wheel containing a plurality of radially disposed platforms, a pivotally mounted bait holder containing a lower hook portion and an upper forwardly extending arm engageable when in its foremost position with said wheel for holding it against rotation with at least one of said platforms substantially horizontally disposed, a cage in communication with the region below said horizontally disposed platform, a bait compartment at the rear of the wheel and adjacent the region above said horizontally disposed platform, a wall at the rear of the bait compartment containing a plurality of apertures therein, a scent compartment behind said wall, and a weight on said arm positioned forwardly with respect to the pivotal mounting of the bait holder, whereby the hook portion thereof will be yieldably held in abutment with said wall and the said arm in its said foremost operable position.

2. In an animal trap, a rotatably mounted wheel containing a plurality of radially disposed platforms, a pivotally mounted bait holder containing a lower hook portion and an upper forwardly extending arm engageable when in its foremost position with said wheel for holding it against rotation with at least one of said platforms substantially horizontally disposed, a cage in communication with the region below said horizontally disposed platform, a bait compartment at the rear of the wheel and adjacent the region above said horizontally disposed platform, a wall at the rear of the bait compartment containing a plurality of apertures therein, a scent compartment behind said wall, and a weight on said arm positioned forwardly with respect to the pivotal mounting of the bait holder, whereby the hook portion thereof will be yieldably held in abutment with said wall and the said arm in its said foremost operable position, the said hook portion being within said bait compartment and adjacent the apertures in said wall.

3. In an animal trap, a cage, an upper unit mounted thereupon and containing a forward wall, a rear wall and a lateral wall, the said front and rear walls containing at the side opposite said lateral wall bearing apertures, a wheel with axial shafts rotatably mounted within said bearing apertures and containing a plurality of radially disposed platforms, a housing extending upwardly from the said rear wall, a partition within said housing forming a forwardly disposed bait compartment and a rearwardly disposed scent compartment, said partition containing a plurality of apertures therein, a pivotally mounted bait holder containing a lower hook portion adjacent said apertures and an upper forwardly extending arm engageable when in its foremost position with said wheel for holding it against rotation with at least one of said platforms substantially horizontally disposed, the said bait compartment being adjacent the region above said horizontally disposed platform, the said cage being in communication with the region below said horizontally disposed platform, the said hook portion of the bait holder being in abutment with said partition when its said arm is in its said foremost position.

4. In an animal trap the combination according to claim 3, at least one of the walls rotatably supporting the said axial shafts of the wheel being yieldably movable outwardly from the wheel out of engagement with the adjacent shaft.

5. In an animal trap, the combination according to claim 3, further provided with a cover unit containing a side wall and a top portion, the said wall being secured to and extending upwardly from said lateral wall, and the top portion overlying the wheel, whereby an entrance chamber is formed by said side wall, top portion, said horizontally disposed platform and an adjacent platform.

WILLIAM PAIUK.